April 12, 1966  H. O. LOPER ETAL  3,245,273
STAMPED PULLEY CONSTRUCTION
Filed Feb. 24, 1964  2 Sheets-Sheet 1
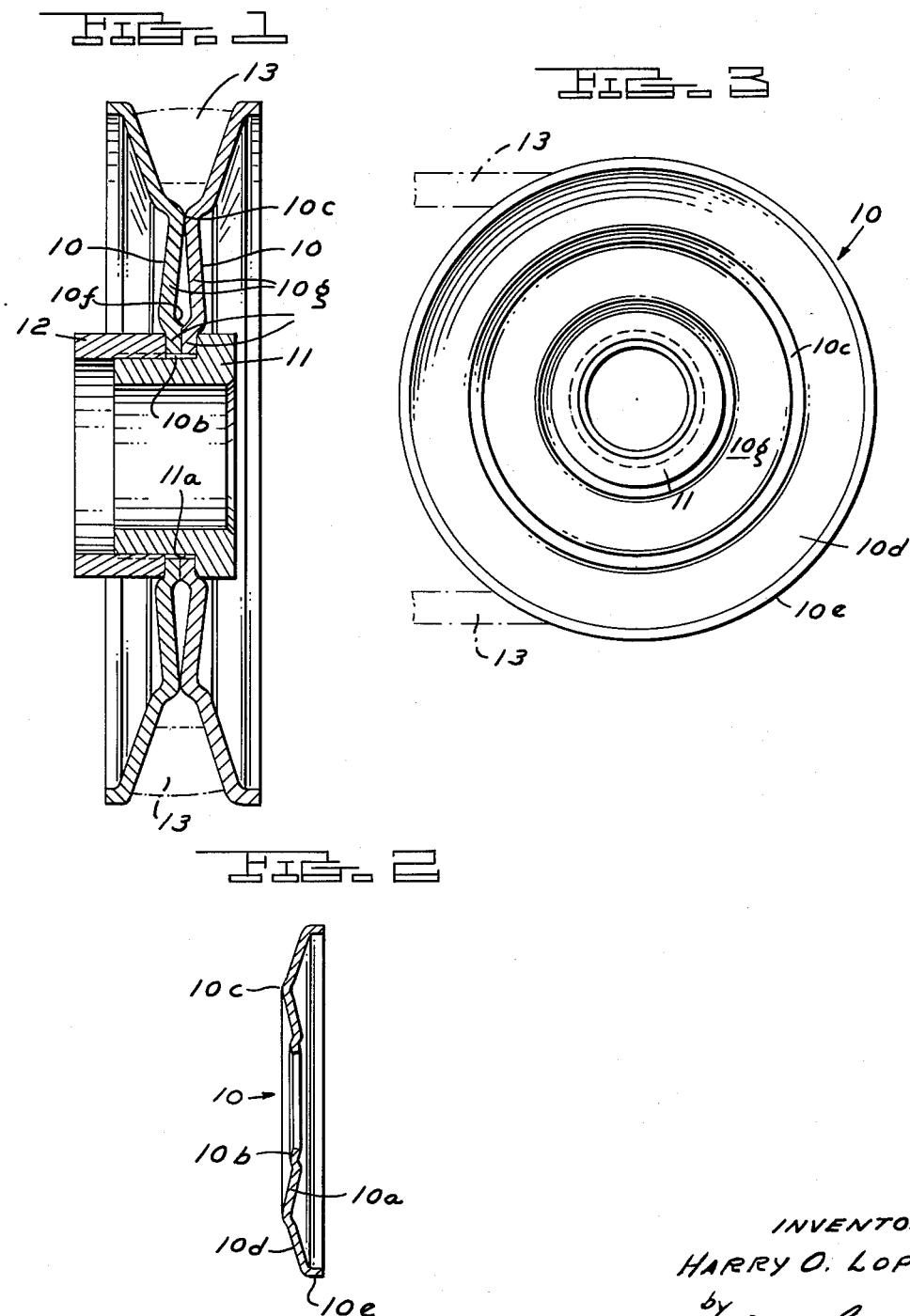
INVENTOR
HARRY O. LOPER
by
ATTORNEYS

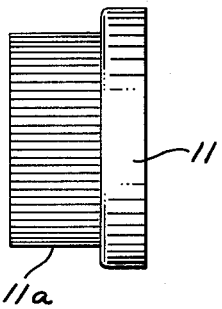
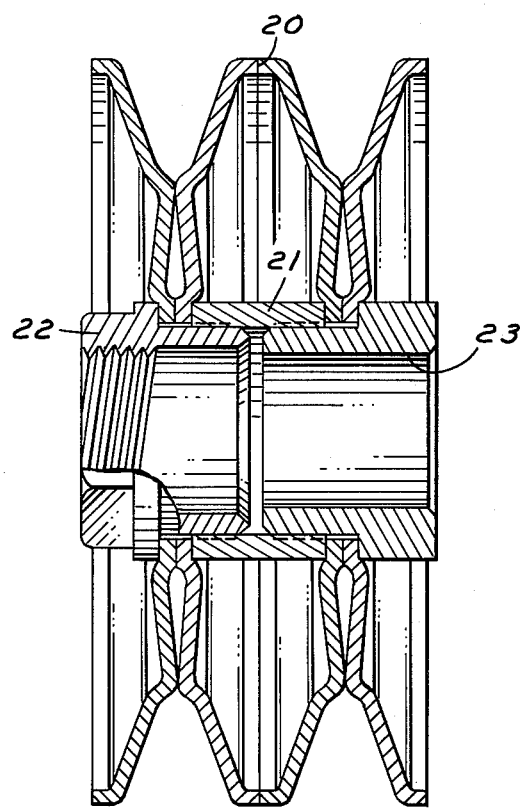

United States Patent Office 3,245,273
Patented Apr. 12, 1966

3,245,273
STAMPED PULLEY CONSTRUCTION
Harry O. Loper, Ypsilanti, George T. Timoff, Pontiac, and Henry J. Anderson and Edward F. Schlee, Jr., Birmingham, Mich., assignors, by mesne assignments, to The Eynon Company, Detroit, Mich., a corporation of Michigan
Filed Feb. 24, 1964, Ser. No. 346,918
18 Claims. (Cl. 74—230.4)

This invention relates to a stamped pulley construction and more particularly to a V-belt pulley construction wherein stamped pulley halves abutting at the centerline of the plane of belt operation are assembled together under pre-loaded condition to withstand separating forces arising from loaded belt operation. Pre-loading is effected by dishing at least one and preferably both of the contacting faces of the pulley halves to provide initial contact at the base of the V-groove faces in which the belt runs with some free state separation at the radially inward portions adjacent the shaft or hub on which the pulley is mounted so that when the separated portions are forced together a pre-loaded pressure is established between the pulley halves at the base of the V-groove. Through the provision of such pre-loading the necessity for riveting, spot welding, brazing or like means for holding stamped pulley halves against separation is avoided, resulting in a better balanced pulley for high-speed operation as well as the use of lighter gauge materials for a given capacity in belt pull and other economies of construction. These and further objects of the invention will be more apparent from the following description of a preferred embodiment of the invention and modification thereof as illustrated in the drawings wherein:

FIG. 1 is a sectional elevation taken through a pulley assembly in an axial plane;

FIG. 2 is a similar sectional view of a single pulley half in free condition before assembly;

FIG. 3 is an axial view of the pulley assembly shown in FIG. 1;

FIG. 4 is a side elevation of a knurled hub used in the pulley assembly of FIG. 1; and FIG. 5 is an axial sectional view of a modified dual pulley assembly.

Referring to FIG. 1 it will be seen that the pulley assembly comprises a pair of sheet metal, stamped identical pulley halves 10, a hub 11 and retainer ring 12. In its free condition each pulley half 10 is preferably formed with a dished face 10a terminating at its radially inward edge in a stepped contact ring 10b offset substantially in an axial direction from the transverse centerline of the pulley established by the contact lip 10c at the base or root of the angular V-belt face 10d and with the radially outer perimeter of the pulley terminating in a cylindrical flange 10e.

In assembled condition the radially inward terminal rings 10b of two opposed pulley halves are pressed together, pre-loading the abuting opposed lips 10c under substantial pressure capable of resisting the spreading or separating pressure of the V-belt 13 during operating conditions. As best shown in FIG. 4, the hub 11 is preferably provided with a knurled surface 11a having an outside diameter providing a slip-fit relationship with the inside diameter of the pulley halves in their free state as shown in FIG. 2 so that the inward terminal edges of the pulley halves will bite into the knurled grooves when pressed together in assembled relationship decreasing the inside diameter thereof. The inside diameter of the retainer ring 12 is preferably provided with a substantially greater interference press-fit dimensional relationship with the knurled surface of the hub 11 so that a simple pressing operation locks the four-piece pulley assembly in rigid operating condition. The step 10f outside the contact ring portion 10b provides angular relationship between the pulley half walls 10g when the abutting rings 10b are in assembled contact in order to maximize the pressure contact at the lips 10c which as in the case of a Belleville washer, may reach a maximum short of a fully flattened condition.

The pulley halves need not be manufactured of spring or heat treated steel in order to develop an effective pre-load since the modulus of elasticity even for relatively soft low carbon steel is adequate to develop an effective pre-load and the absence of relative movement of the pulley halves in operating condition avoids any problems of metal fatigue under flexural stresses. As a specific example of appropriate specifications for a 2¾ inch diameter pulley combining the constructional features illustrated in FIGS. 1–4, a normal grade of SAE 1010 may be employed having a stamping wall thickness of .060", a free offset of the contact face 10b from the transverse centerline of .070", a step of .03" an included pulley angle of 36°, a .010" deep knurl, an .018" diametral press-fit between the retainer ring 12 and knurled hub 11 were found to provide a pulley which could be driven at 3,000 r.p.m. with a radial load of 300 pounds belt pull for a period of eight hours without failure.

It will be seen that this pulley construction in addition to being relatively simple and economical of fabrication and assembly is inherently free of any irregularities which could cause an unbalanced condition. The knurled and press-fit relationship of the parts provides an effective driving connection between the hub and the pulley halves making unnecessary any riveting, welding, brazing or key connection therebetween.

The basic construction can be readily adapted to numerous specific modifications for particular requirements. For example, as shown in FIG. 5, a dual pulley arrangement can be readily provided with abutment between outer rims 20 and a common retaining ring 21. In this embodiment one of the hubs is formed with a threaded hex head 22 while the internal diameter 23 of the other is dimensioned for shaft bearing so that through the simple provision of an end-threaded driveshaft the complete dual pulley assembly may be held in driving position on the shaft without the need for any external nuts, keys or drive connections.

Numerous other modifications will occur to those skilled in the art without departing from the scope of the invention as defined in the folowing claims.

We claim:

1. A V-belt pulley construction comprising a pair of opposed dished washer pulley halves having V-belt groove forming extensions at the outer perimeter, said pulley halves having configurations with free-form axial displacement of radially spaced engaging portions to provide separation resistant pre-load pressure engagement at the root of the pulley groove when the radially innermost portions of said pulley halves are assembled together, and means holding said radially innermost portions sprung together in assembled relationship.

2. A pulley construction as set forth in claim 1 wherein each of said pulley halves comprises a sheet metal disc.

3. A pulley construction as set forth in claim 1 wherein said pulley halves comprise identical sheet metal discs.

4. A pulley construction as set forth in claim 1 wherein said pulley halves comprise opposed sheet metal discs having central hub apertures, at least one of said discs being dished away from the other to provide a free-form axial separation at the hub aperture which may be diminished at assembly to provide said pre-load.

5. A pulley construction as set forth in claim 1 wherein said pulley halves comprise identical sheet metal discs having central hub apertures both of said discs being dished away from the other to provide a free-form axial separation at the hub aperture which may be diminished at assembly to provide said pre-load.

6. A pulley construction as set forth in claim 1 wherein said pulley halves comprise identical sheet metal discs having central hub apertures, both of said discs being dished away from the other to provide a free-foam axial separation at the hub aperture which may be diminished at assembly to provide said pre-load, the radially innermost annuli adjacent the hub aperture having a step extending toward the other pulley half adapted to provide abutting assembly engagement while the radially outer portions inside the root of the pulley groove remains somewhat dished.

7. A pulley construction as set forth in claim 1 wherein said pulley halves comprise identical sheet metal discs having central hub apertures.

8. A pulley construction as set forth in claim 7 including a shouldered hub for engaging one of the pulley halves extending through the central apertures, and means seated on said hub for holding the apertured annuli of the pulley halves tightly together.

9. A pulley construction as set forth in claim 7 including a shouldered hub for engaging one of the pulley halves extending through the central apertures, and means seated on said hub for holding the apertured annuli of the pulley halves tightly together said pulley halves having axially extending flanges at their outer perimeters.

10. A pulley construction as set forth in claim 7 including a shouldered hub for engaging one of the pulley halves extending through the central apertures, and means seated on said hub for holding the apertured annuli of the pulley halves tightly together, said hub having a threaded portion adapted to engage the theraded end of a pulley mounting shaft.

11. A pulley construction as set forth in claim 7 including a shouldered hub for engaging one of the pulley halves extending through the central apertures, and means seated on said hub for holding the apertured annuli of the pulley halves tightly together said hub having a threaded portion adapted to engage the threaded end of a pulley mounting shaft and a head adapted for wrench engagement.

12. A pulley construction as set forth in claim 7 including a knurled cylindrical hub, said hub having a shoulder for engaging one of the pulley halves, and extending through said central apertures, and a ring having an interference fit thereon to hold the pulley halves together.

13. A pulley construction as set forth in claim 12 wherein the apertured edges of said pulley halves have an interference fit with said knurled surface.

14. A pulley construction as set forth in claim 12 wherein the apertured edges of said pulley halves have an interference fit with said knurled surface in assembled condition, said apertured pulley halves having a slip-fit dimension relative to said knurled surface in their free-form condition.

15. A dual pulley construction comprising a pair of pulleys as set forth in claim 12 assembled with said ring being common to said pair of pulleys and having an interference fit with said hub.

16. A dual pulley construction comprising a pair of pulleys as set forth in claim 12 and two of said pulley halves having axially extending outer perimeter flanges in abutting relation.

17. A dual pulley construction comprising a pair of pulleys as set forth in claim 12, the hub of one of said pulleys having a theraded portion for engaging the threaded end of a mounting shaft.

18. A dual pulley construction comprising a pair of pulleys as set forth in claim 12, the hub of one of said pulleys having a threaded portion for engaging the threaded end of a mounting shaft and the other of said pulley hubs having a reduced diameter to serve as a pilot for said mounting shaft.

References Cited by the Examiner

UNITED STATES PATENTS

| | | | |
|---|---|---|---|
| 1,266,579 | 5/1918 | Garcelon | 74—230.8 |
| 2,095,025 | 10/1937 | Browning | 74—230.8 |
| 2,188,953 | 2/1940 | Mitchell | 74—230.8 |

FOREIGN PATENTS

| | | |
|---|---|---|
| 535,637 | 12/1940 | Great Britain. |

DAVID J. WILLIAMOWSKY, *Primary Examiner*

DON A. WAITE, *Examiner.*

J. A. WONG, *Assistant Examiner.*